US008153716B2

(12) United States Patent
Pitt et al.

(10) Patent No.: US 8,153,716 B2
(45) Date of Patent: *Apr. 10, 2012

(54) DISPERSANT FOR REDUCING VISCOSITY OF PARTICULATE SOLIDS

(75) Inventors: Alan R. Pitt, Sandridge (GB); Trevor J. Wear, Harrow (GB); John H. Hone, Chalfont St. Peter (GB); Andrew M. Howe, Watford (GB)

(73) Assignee: Eastman Kodak Company, Rochester, NY (US)

( * ) Notice: Subject to any disclaimer, the term of this patent is extended or adjusted under 35 U.S.C. 154(b) by 981 days.

This patent is subject to a terminal disclaimer.

(21) Appl. No.: 11/722,674

(22) PCT Filed: Dec. 22, 2005

(86) PCT No.: PCT/GB2005/005000
§ 371 (c)(1),
(2), (4) Date: Feb. 5, 2008

(87) PCT Pub. No.: WO2006/067457
PCT Pub. Date: Jun. 29, 2006

(65) Prior Publication Data
US 2008/0145546 A1 Jun. 19, 2008

(30) Foreign Application Priority Data

Dec. 23, 2004 (GB) .................................. 0428262.0

(51) Int. Cl.
*C08K 3/10* (2006.01)
(52) U.S. Cl. .................. 524/403; 427/372.2; 427/385.5; 524/407; 524/413; 524/425; 524/430; 524/431; 524/432; 524/433; 524/434; 524/435; 524/436; 524/437; 524/440; 524/441; 524/443
(58) Field of Classification Search .................. 524/403, 524/407, 413, 430, 431, 432, 433, 425, 434, 524/435, 436, 437, 440, 441, 443; 427/372.2, 427/385.5
See application file for complete search history.

(56) References Cited

U.S. PATENT DOCUMENTS

| 2,985,625 | A | | 5/1961 | Jones |
| 3,117,944 | A | | 1/1964 | Harrell |
| 3,935,023 | A | | 1/1976 | Derolf |
| 4,548,733 | A | | 10/1985 | Vincent |
| 5,231,131 | A | * | 7/1993 | Chu et al. ........................ 524/504 |
| 6,489,382 | B1 | * | 12/2002 | Giesecke et al. ................ 524/89 |
| 6,660,793 | B1 | * | 12/2003 | McIntyre et al. ............. 524/441 |
| 2002/0027304 | A1 | | 3/2002 | Robson et al. |
| 2003/0144399 | A1 | | 7/2003 | Matta et al. |
| 2004/0019148 | A1 | | 1/2004 | Suau et al. |
| 2004/0258608 | A1 | * | 12/2004 | Cayton et al. .............. 423/592.1 |

FOREIGN PATENT DOCUMENTS

| DE | 197 03 582 | 8/1998 |
| EP | 0 850 879 | 7/1998 |
| EP | 0 736 491 | 8/1998 |
| WO | WO97/15382 | 5/1997 |

* cited by examiner

*Primary Examiner* — David W Wu
*Assistant Examiner* — Marie Reddick
(74) *Attorney, Agent, or Firm* — Andrew J. Anderson

(57) ABSTRACT

The invention provides a dispersant for an aqueous dispersion of positively charged or chargeable solid particulates which comprises a compound having an anchoring moiety linked to a polymeric hydrophilic moiety, the anchoring moiety containing at least one acid and/or hydroxy group and having an overall acidity or neutrality and the polymeric moiety having a lower affinity for the particulate surface than the anchoring moiety. The anchoring moiety preferably contains at least two acid groups, preferably carboxylic acid groups, attached either in a [1,1], [1,2] or [1,3] relationship and is linked to the polymeric moiety, which is preferably derived from acrylamide or methacrylamide monomer units, preferably by a sulfur atom. The dispersant can reduce the viscosity of an aqueous dispersion of positively charged or chargeable solid particulates and can reduce the tendency of the resulting dispersion to form a gel or a yield stress material. The dispersant facilitates the processing of the resulting compositions in manufacturing operations and it may be used, for example, as a component of a coating material, a ceramic, paint, refractory material, filler or in an inkjet recording paper or film. Additionally, the dispersant can allow the use of higher concentrations of solid particulates and enable control of the yield stress, as some yield is often beneficial in helping prevent or reduce sedimentation.

16 Claims, 3 Drawing Sheets

DISPERSANT FOR REDUCING VISCOSITY OF PARTICULATE SOLIDS

CROSS REFERENCE TO RELATED APPLICATION

This application is related to copending UK patent application No. 0428260.4.

FIELD OF THE INVENTION

The invention relates to a dispersant for an aqueous solid dispersion or composition therefrom, and in particular a dispersion of positively charged or chargeable solid particulates, which can reduce the viscosity and/or the tendency to form a gel or a yield stress material, especially following periods of high shear stress. The solid particulate dispersion may be used, for example, as a component of a coating material, an inkjet recording paper or film, a chemical-mechanical polishing/abrasive material, a ceramic, a cement, a paint, a catalyst system, a refractory material, a surface-frictionising formulation or a filler or any product that incorporates nanoparticulate materials.

BACKGROUND OF THE INVENTION

Manufacturing formulations involving aqueous solid dispersions often require to be processed at a high concentration of solids for one or more of the following reasons: to improve the costs/efficiency of transportation, to increase laydown or to reduce the drying load, as the removal of water is wasteful and expensive. The formulations also need to be stable over a wide range of shear, which extends from low to high shear rates. After mixing, aqueous dispersions of particulates, especially those containing high concentrations of solid, tend to form a 'yield stress material' as the shear stress is relaxed, the viscosities climbing dramatically with the decreasing shear such that, for example, gels may be deposited in zones of reduced shear. The high viscosity of the dispersions at low shear affects their dispersability and flowability, making the systems difficult to stir, pump, transport, coat or pour. Moreover their tendency to form a gel or a yield stress material in regions of low flow is often more of a problem, as gelation is often irreversible and consequently totally unacceptable for manufacturing processes that rely on systems to flow.

It is known in the art that an inorganic, organic or polymeric form of acid may be added to an aqueous dispersion of alumina. Thus U.S. Pat. No. 3,935,023 describes the use of hydrochloric acid to form stable dispersions of alumina, whilst EP-A-0 736 491 teaches the use of a viscosity-reducing agent for an alumina sol based on a compound having a carboxyl group or a sulfonic acid group, or a compound selected from the group consisting of formamide or acetamide, relating to small non-polymeric molecules. United States Patent Application No. 2002/0027304 discloses the use of acetic acid, citric acid or a polyacrylate as a viscosity modifier for alumina systems.

DE 19703582 describes the use of carboxylic acid and salts for reducing the viscosity of aqueous pigment dispersions of zinc oxide and titanium dioxide pastes. WO 9715382 discloses that metal oxides can be dispersed in an aqueous medium using a hydrolyzed polymer containing maleic anhydride for use in coatings and cosmetics and BE 903772 and U.S. Pat. No. 4,687,789 describe an acrylic acid/itaconic acid/methacrylic acid copolymer for stabilization of a zinc oxide or titanium dioxide dispersion for providing rheological stability.

EP-A-0 697 998 teaches the combination of zinc oxide with a polyacrylic acid dispersant to provide a colloidal-sized zinc oxide material. WO 2003/037984 describes a water-soluble polyelectrolyte/polyacid copolymer for use as an inorganic pigment dispersant for dispersing zinc oxide and zinc oxide/titanium dioxide slurries. EP-A-1 207 143 discloses methods for dispersing and binding ceramic materials in aqueous media using water-soluble polymers having pendant derivatized amide, ester or ether functionalities.

U.S. Pat. No. 4,548,733 discloses a method of reducing the viscosities of aqueous slurries of particulate materials, such as titanium dioxide, silicon dioxide, iron oxides, cobalt-modified iron oxides, aluminum oxide, antimony oxide, chromium dioxide, zinc oxide, zinc sulfide, basic carbonate white lead, basic sulfate white lead, barium sulfate, calcium carbonate, magnesium silicates, aluminum silicates, mica and clays, by using anionic siliconates of silylorganocarboxylates, sulfonates and phosphonates.

WO 2004/000916 describes a process to prepare a stable dispersion of nanoparticles in aqueous media using a copolymer/cyclic phosphate dispersant, and the use of an acrylamide polymer for flocculating the boehmite form of alumina is disclosed in U.S. Pat. No. 3,117,944.

Copending UK patent application No. 0428260.4 discloses the particular use of a dispersant to reduce the viscosity and/or tendency to gel of, specifically, the boehmite form of alumina which has an unusual rheological character which is dependent on its shear stress history.

There are a number of publications which further teach the use of acids as dispersion stabilizers, such as, for example, 'Ceramic Development: Programme Research at the Swedish Ceramic Institute 1993-1996' and Journal of Ceramic Processing Research, 3 (2002) 10-14 'Suspension Systems for Coagulation Processing' by C. Pagnoux, which discloses the use of a low molecular weight sulfonic acid (TIRON) and a polyacrylic acid (DISPEX N40).

P. C. Hidber et al., in Journal of the European Ceramic Society, 17 (1997) 239-249 'Influence of the Dispersant Structure on Properties of Electrostatically Stabilized Aqueous Alumina Suspensions' describes a dispersant based on a hydroxy- and carboxy acid-substituted benzene ring. A. U. Khan et al., J. Mater. Chem., 12 (2002) 1743-1747 'The Strength of Colloidal Interactions in the Presence of Ceramic Dispersants and Binders' discusses the use of the ammonium salt of aurintricarboxylic acid (ALUMINON) as a dispersant of alumina dispersions.

The use of citric acid, gallic acid and 2-phosphonobutane-1,2,4,-tricarboxylic acid, as dispersants for alumina for producing zero cement high-alumina castables for refractory purposes is described in A. R. Studart et al., Journal of the European Ceramic Society, 23 (2003) 997-1004 'Selection of Dispersants for High-Alumina Zero-Cement Refractory Castables'. P. C. Hidber et al., in J. Am. Ceram. Soc., 79[7] (1996) 1857-67 'Citric Acid—A Dispersant for Aqueous Alumina Suspensions' discusses the science of the high affinity of citric acid for an α-alumina surface.

PROBLEM TO BE SOLVED BY THE INVENTION

There is a need for a dispersant additive for an aqueous dispersion of positively charged or chargeable solid particulates, especially at high concentrations of solids, that can provide a low viscosity-increment with increasing concentration of solids and/or a reduced tendency to form a gel or a yield stress material following periods of high shear stress, thereby facilitating handling and processing of a resulting composition. Even though acid and other systems can be used to reduce the viscosity of dispersions of positively charged or chargeable solid particulates as described in the prior art above, their ability to accomplish this tends to be fairly limited, particularly when shear stresses are reduced following the higher shear stresses of mixing. Furthermore, prior art materials are not that effective in preventing such systems from forming yield stress materials when the systems are relaxed from the high shear stresses of mixing, and especially when the systems show a tendency to gel. The rheological problems defined above limit the concentration of solids that can be loaded into a dispersion formulation if the resulting composition is to remain manageable and processable.

SUMMARY OF THE INVENTION

The present invention thus provides a dispersant for an aqueous dispersion of positively charged or chargeable solid particulates which comprises a compound having an anchoring moiety linked to a polymeric hydrophilic moiety, the anchoring moiety containing at least one acid and/or hydroxy group and having an overall acidity or neutrality and the polymeric moiety having a lower affinity for the particulate surface than the anchoring group.

In another aspect there is provided a coating composition containing positively charged or chargeable solid particulates, the composition comprising one or more dispersants, as hereinbefore defined, in association with an aqueous dispersing medium, and optionally a binder.

In yet another aspect there is provided a method of coating a substrate comprising the steps of
  (a) providing a composition of positively charged or chargeable solid particulates;
  (b) combining the composition with one or more dispersants, as hereinbefore defined, in association with an aqueous dispersing medium, and optionally a binder, to form a coating composition;
  (c) applying the coating composition to the substrate to form a coating thereon; and
  (d) drying the resultant coating.

In a further aspect there is provided a method of reducing the viscosity and/or tendency to form a gel or a yield stress material of a dispersion of positively charged or chargeable solid particulates which comprises the addition thereto of one or more dispersants, as hereinbefore defined, in association with an aqueous dispersing medium, and optionally a binder.

In yet a further aspect there is provided the use of a dispersion for the reduction of viscosity and/or tendency to form a gel or a yield stress material of a dispersion of positively charged or chargeable solid particulates, and in particular for the preparation of an inkjet recording element to provide stability over a wide range of shear stress whilst retaining satisfactory gloss and porosity, the dispersion comprising one or more dispersants, as hereinbefore defined, in association with an aqueous dispersing medium, and optionally a binder.

In an additional aspect there is provided an inkjet recording element comprising a support having thereon at least one image-receiving layer, said inkjet recording element containing a coating composition as hereinbefore defined.

ADVANTAGEOUS EFFECT OF THE INVENTION

This invention provides an efficient dispersant for an aqueous dispersion of positively charged or chargeable solid particulates that greatly reduces the viscosity and/or yield stress problems associated therewith when the dispersion is subjected to gradual relaxation of shear stress following the high shear stresses encountered during mixing. The dispersant thus facilitates the manipulation of the resulting composition, such as stirring, pumping, transporting, coating or pouring, even at high concentrations of solids, due to improved dispersability and flowability. The dispersant also can enable the use of higher concentrations of solid particulates and the control of the yield stress, as some yield stress is often beneficial in helping prevent or reduce sedimentation.

DETAILED DESCRIPTION OF THE INVENTION

Aqueous dispersions of positively charged or chargeable solid particulates, especially at high concentrations of solids, and their resulting compositions, tend to exhibit increasingly high viscosity when shear stresses are relaxed following the high shear conditions of mixing. Eventually the rate of increase in viscosity with decreasing shear stress often becomes so high that the system becomes a yield stress material, for example it may tend to gel and not to flow.

As used herein, 'yield stress' is defined as a critical shear stress value below which a plastic or viscoplastic material behaves like a solid (i.e. will not flow). As used herein the term 'yield stress material' is defined as a material that exhibits a 'yield stress'. In many cases this will be a gel but the term is not to be construed as limited thereto, as it may, for example, be a another solid form, such as a paste or 'cake'.

Once the yield stress is exceeded, a plastic material yields while a viscoplastic material flows like a liquid. This problem can manifest itself easily in any manufacturing process utilizing such a dispersion.

The objective of this invention therefore was to provide a water-soluble dispersant which reduce these problems and so increases the utility of the corresponding dispersions in manufacturing processes, relative to the use of other dispersant materials described in the prior art.

The invention accomplishes this by providing a dispersant that, when added to the dispersion, reduces the intrinsic viscosity of the dispersion and/or reduces the tendency of the dispersion to form a gel or a yield stress material, relative to the system in the absence of dispersant or the system in the presence of other common dispersants.

Owing to the effectiveness of the dispersants of the invention, the invention provides a method of increasing the concentration of solids in the aqueous dispersion without increasing the viscosity or tendency to form a gel or a yield stress material, relative to either a dispersion without the dispersant or with a prior art dispersant. Furthermore the invention provides a method of controlling the yield stress of the gel in the aqueous dispersion by controlling the amount of added dispersant and added solids, such that the solids loading is higher than that obtainable using prior art dispersants. The present invention thus facilitates the fluid processing and general fluid management of such dispersions in manufacturing processes, due to the improved dispersability and flowability engendered within the system.

Figure 1:
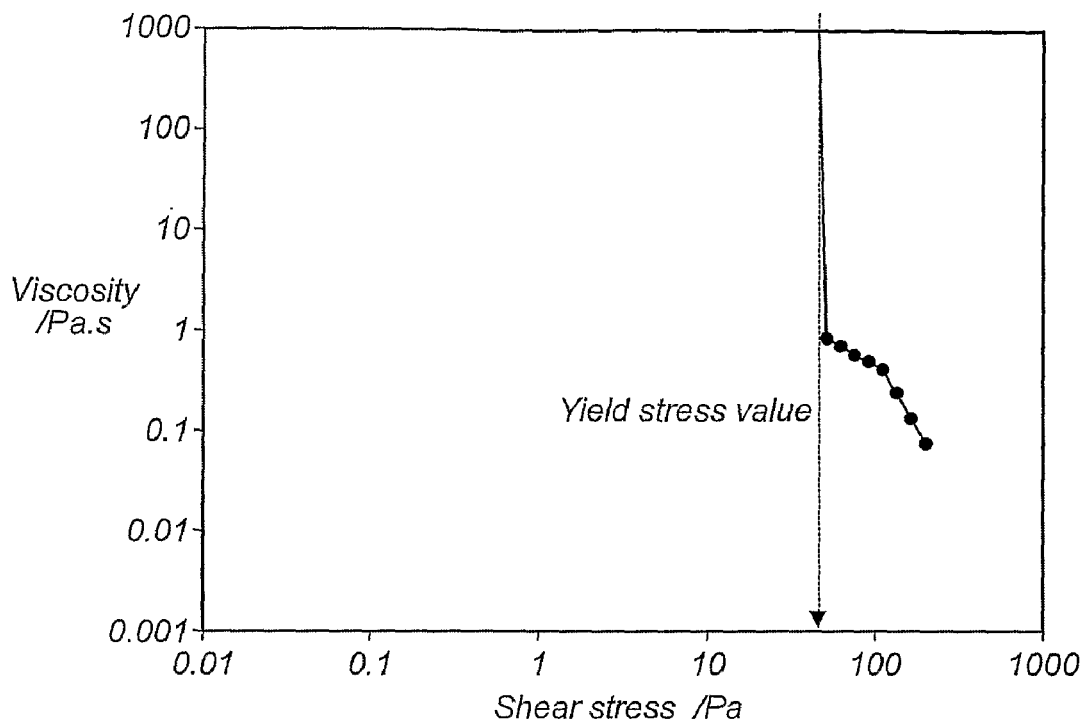
FIG. 1 shows the viscosity of the zinc oxide and water, with no dispersant, with reducing shear stress.

FIG. 1 illustrates the rise in viscosity that occurs in a dispersion of fine zinc oxide powder in the absence of dispersant when the shear stress is relaxed from high shear stress, and the subsequent steep, almost vertical, rise in viscosity that is associated with the gelling point (log-log scaling), i.e. when the system becomes a gelling yield stress material. As explained in more detail hereinafter, the shear stress was increased steadily in an incremental manner from a low or intermediate shear stress to a high shear stress over a period of 20-30 minutes to ensure thorough mixing and, after reaching the high shear stress point, the shear stress was decreased incrementally in a steady, controlled manner.

A parameter was selected to represent the approximate value of shear stress associated with this steep rise in viscosity, which could distinguish the relative efficacy of different dispersants. The shear stress at a viscosity of 1000 Pa·s, which was always positioned on the steep rising part of the data, was selected and defined herein as the "yield stress value".

The primary aim for the dispersants of the invention therefore was to eliminate or reduce the yield stress value of the dispersion at low shear stress more effectively than known dispersant materials. Elimination of the yield stress condition means that the viscosity does not rise steeply with decreasing shear stress and that the viscosity never reaches the climes of 1000 Pa·s. Instead it tends to level out with decreasing shear stress, suggesting the system has a limiting value of low shear viscosity, i.e. is the typical behaviour for a fluid dispersion.

Examples of solid particulate systems that are or can be positively charged for use in the invention are: metal oxides, metal hydroxides, metal carbonates, nitrides, ceramics and metals and positively charged or chargeable latexes, all at a pH below their isoelectric point (IEP). The present invention is particularly suited to inorganic solid particulates with an IEP above the pH of water saturated with carbon dioxide, i.e. pH>5.8, but is not limited to this condition, since the pH of a system can be lowered below its IEP by the addition of a suitable acid, provided the system and any associated product or process can tolerate the presence of the acid. IEPs can also be manipulated to advantage by the use of different ion types in solution via specific adsorption.

Examples of metal oxides that possess an IEP pH>5.8 are, for example, $Al_2O_3$, $CeO_2$, $CO_3O_4$, $Cr_2O_3$, CuO, $Eu_2O_3$, $Fe_2O_3$, HgO, MgO, NiO, $PuO_2$, $TiO_2$, $UO_2$, ZnO and $ZrO_2$. Metal hydroxides that possess an IEP pH>5.8 are exemplified by: $Al(OH)_3$, $Cu(OH)_2$, $Fe(PH)_3$, $Mn(OH)_2$, $Mg(OH)_2$ and $Ni(OH)_2$. An example of a carbonate that possesses an IEP pH>5.8 is $CaCO_3$, whilst an example of a nitride that possesses an IEP pH>5.8 is $Si_3N_4$. Metals that possess an IEP pH>5.8 are, for example: Ni, Al, Cu, Zn, Co and Cr and examples of ceramics that possess an IEP>pH 5.8 are: Y-TZP, 12Ce-TZP and Y-TZP/12Ce-TZP (Journal of Materials Science, 2002, 37, 1661-1665).

The dispersant for use in the invention comprises a compound having an anchoring moiety linked to a polymeric hydrophilic moiety, the anchoring moiety containing at least one acid and/or hydroxy group and having an overall acidity or neutrality and the polymeric moiety having a lower affinity for the particulate surface than the anchoring group.

The acid group is preferably selected from a carboxylic acid, sulfonic acid or phosphoric acid, preferably a sulfonic acid or more preferably a carboxylic acid group. The polymeric hydrophilic moiety is preferably polyacrylamide, poly-N,N-di-methylacrylamide, poly-2-acrylamido-2-hydroxymethyl -1,3-propandiol, polymethacrylamide, poly-N-methylacrylamide or poly-N-methylmethacrylamide or a mixture thereof. More preferably the polymeric moiety is polyacrylamide or poly-N,N-dimethylacrylamide.

The polymeric moiety may contain hydrophobic monomers, provided that it remains hydrophilic in character overall and provided that it contains less than 25% hydrophobic groups and preferably less than 12% hydrophobic groups.

In accordance with a preferred embodiment of the invention the dispersant of the invention has the formula (I):—

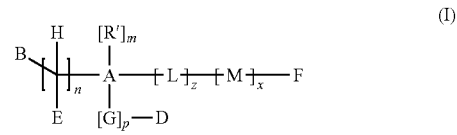

wherein

A is carbon or nitrogen,

R' is hydrogen or an unsubstituted or substituted alkyl, aryl or heterocyclic group and m is 1 when A is carbon and m is 0 when A is nitrogen;

B is an acid group or an ester or amide thereof, or a hydroxy group;

each E is independently hydrogen, an unsubstituted or substituted amino group or an acid group or an ester or amide thereof and n is 0 or an integer from 1 to 10;

D is a hydrogen atom, an unsubstituted or substituted amino group, an acid group or an ester or amide thereof, an unsubstituted or substituted alkyl group or an alkyl group substituted with one or more acid groups or an ester or amide thereof;

G is a carbonyl group or an unsubstituted or substituted alkylene, aminoalkylene or oxyalkylene group and p is 0 or 1;

L is a linking group and z is 0 or 1;

D and L or D, G and L may combine with A to form an unsubstituted or substituted 5-, 6- or 7-membered ring which may include one or more further heteroatoms selected from nitrogen, oxygen and sulfur;

each M is a monomer unit, which may be the same or different, comprising an unsubstituted or substituted acrylamide or methacrylamide, and x is 5-200; and F is hydrogen or a substituent;

with the proviso that (a) the number of acid groups is equal to or greater than the number of amino groups therein and (b) there is at least one hydroxy or acid group.

Preferably A is carbon and R' is hydrogen or a methyl group. When B, E or D is an acid group, or in the case of D or G substituted with one or more acid groups, the acid is preferably selected from a carboxylic acid, sulfonic acid or phosphoric acid, preferably a sulfonic acid or more preferably a carboxylic acid group.

D is preferably hydrogen or a carboxylic acid group and preferably p is 0. n is generally 0 or 1 but when it is an integer from 2 to 10, each E may be the same or different and is preferably hydrogen or a carboxylic acid group. B may a hydroxy group but is preferably a sulfonic or more preferably a carboxylic acid group. The alkylene group in G may contain an acid group, preferably a carboxylic, sulfonic acid or phosphoric acid group. The more preferred anchoring groups contain at least two acid groups, preferably carboxylic acid groups, attached either in a [1,1], [1,2] or [1,3] relationship.

L, when present, is preferably a sulfur atom with z=1. However L may also be a chain of up to about 20 atoms that may contain, for example, one or more unsubstituted or substituted alkylene, ester, thioester, amide, thioamide, ketone, thioketone, ether or thioether groups or L may be, for example, a polyalkylenethio group $[-(CH_2)_q-S]$ group, where q is an integer from 1 to 20 and especially 9, a group $-CH_2COCH_2S$ or a group $-CONH-(CH_2)_rS$, where r is from 1 to 5. z may alternatively be 0 so that there is no linking group present.

The number of monomer units (x) is preferably 10-100, more preferably 10 to 50. In particular in the case of an acrylamide, the number of units from 25 to 35 has been found to be particularly useful. Within the most preferred range it appears that the reduction in viscosity is particularly effective with increasing polymer length. Preferably the polymer is polyacrylamide, poly-N,N-di-methylacrylamide, poly-2-acrylamido-2-hydroxymethyl-1,3-propandiol, poly-methacrylamide, poly-N-methylacrylamide or poly-N-methylmethacrylamide or a mixture thereof. More preferably the polymer is polyacrylamide or poly-N,N-dimethylacrylamide.

Thus M may have either of the structures shown below, with the point of attachment to F being on the right hand side:

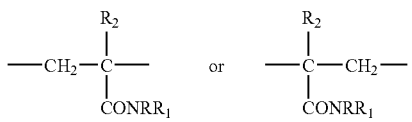

wherein

R, $R_1$ and $R_2$ are independently hydrogen or an unsubstituted or substituted lower alkyl group having 1 to 3 carbon atoms or $R_1$ may be the group $C(CH_2OH)_3$. When R, $R_1$ and $R_2$ are each hydrogen, then M is an unsubstituted acrylamide group and this is preferred. However if R and $R_1$ are each independently a methyl, ethyl, n-propyl, i-propyl or t-butyl group (or $R_1$ a $C(CH_2OH)_3$ group), then $R_2$ will normally be either hydrogen or a methyl group.

F is generally hydrogen but may also be a terminal substituent known to one skilled in the art as not having a significant effect on the aqueous solubility of the molecule. It may be, for example, a halogen atom, an unsubstituted or substituted alkyl group, a thiol, a neutral thioether, ether, ester, or an alkyl- or aryl-sulfonate group.

The combination of anchor moiety and polymer moiety chemistries is essential for the materials of the invention to function as highly effective dispersants. As will be exemplified hereinafter, if one of the materials of the invention is compared to its two component parts in isolation, for example polyacrylamide and mercaptosuccinic acid, the component parts are unable to function as suitable dispersants within the definition and scope of the invention. Indeed the prior art teaches in U.S. Pat. No. 3,117,944 that a polyacrylamide polymer is actually suitable for flocculating alumina, which is the opposite of the function of the materials of this invention.

Moreover the chemical structures of the anchoring moieties defined in the invention can be important to the function of the materials of the invention as highly effective dispersants. As indicated earlier, the anchor moiety contains one or a small number of hydroxy or acidic groups or a combination of the two, and preferably one, or especially two, carboxylic acid groups. However amino groups may also be present in the anchoring group in combination with an acid group, so long as there is not an excess of amino groups in the anchoring moiety.

The chemical structure of the hydrophilic polymer moiety described in this invention can also be important for the materials of invention to function as highly effective dispersants in aqueous media. As hereinbefore described, the polymeric moiety may contain hydrophobic monomers provided that it remains hydrophilic in character overall. The affinity of the hydrophilic polymer for the surface of the solid particulates needs to be less than that of the anchoring moiety, otherwise the polymer is likely to adsorb to the surface of the solid particulates, with the subsequent potential for bridging between the particles which is likely to lead to particle aggregation.

Structures pertaining to formula (I) are illustrated, but not limited to, the following examples (note they are general in terms of the degree of polymerisation x, which is defined above):

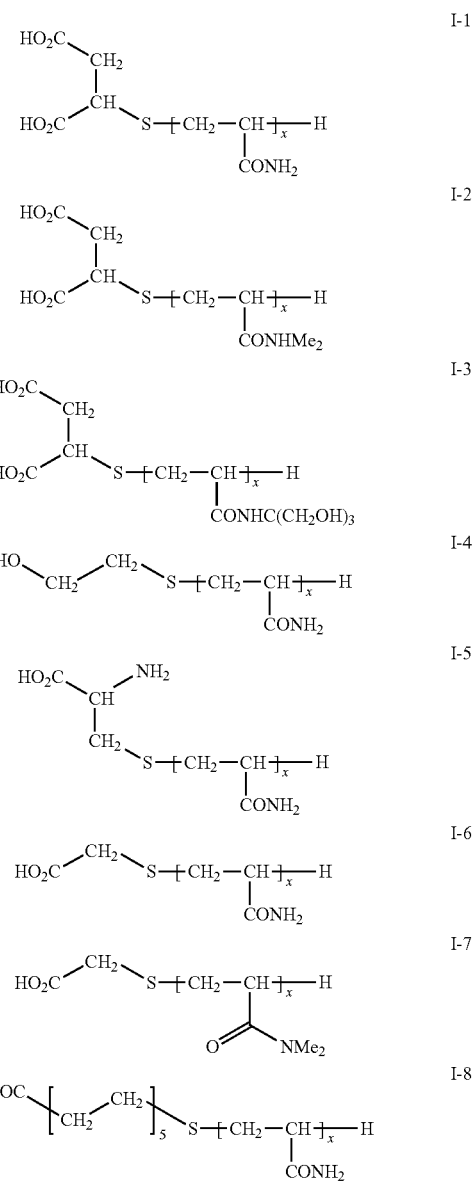

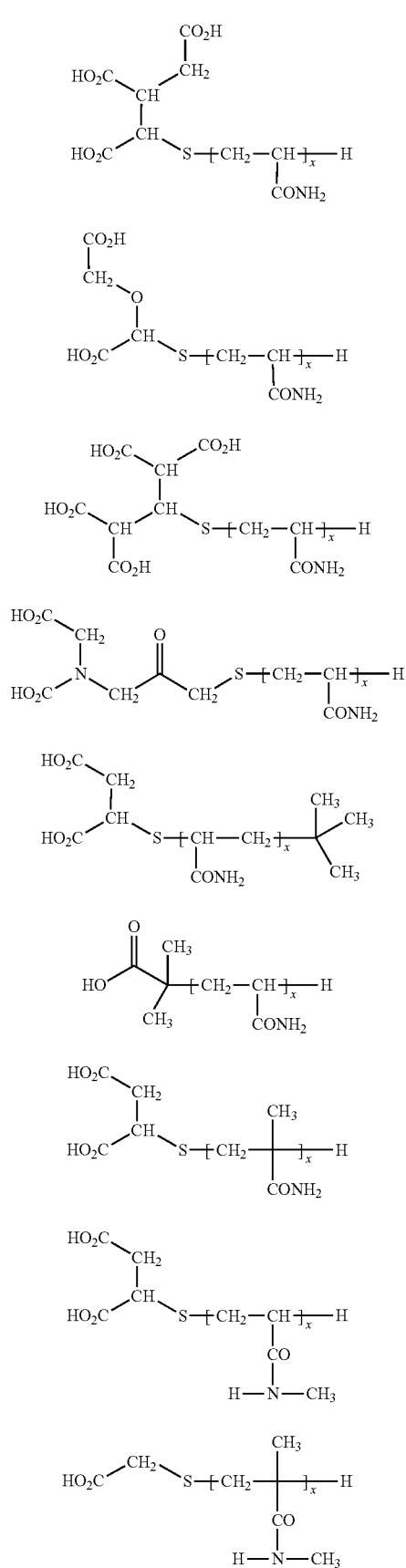
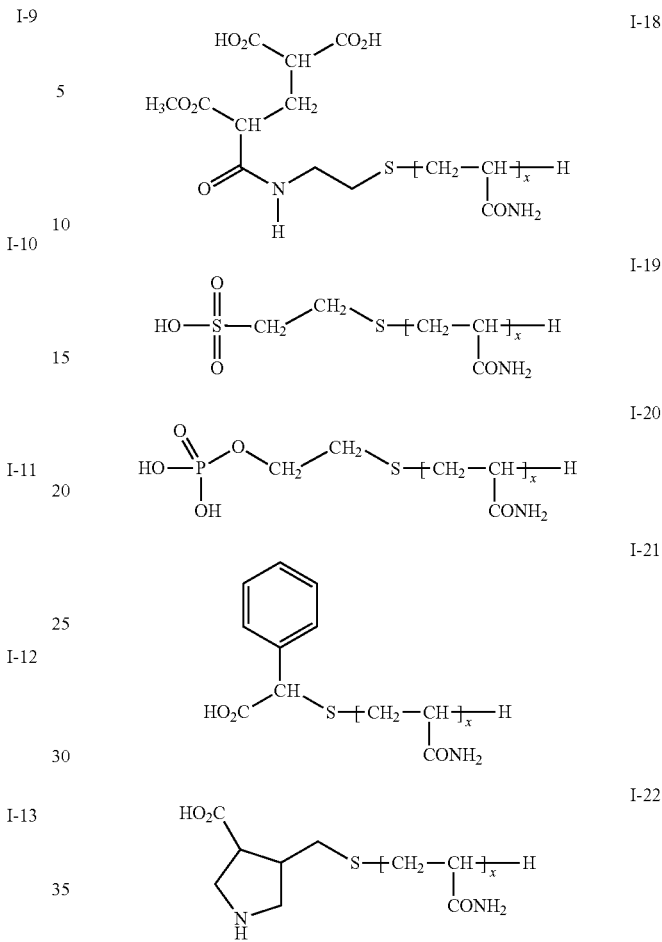
More specific structures of some of the above systems, i.e. where the average degree of polymerisation is defined, are illustrated in the following examples:
| Dispersant | Average Structure (to nearest integer) | $M_n/\text{g} \cdot \text{mol}^{-1}$ ($M_w/M_n$) |
|---|---|---|
| I-1a | 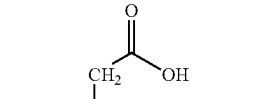 | 1210 (1.11) |
| I-1b | 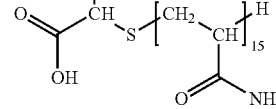 | 2520 |

| Dispersant | Average Structure (to nearest integer) | $M_n$/g·mol$^{-1}$ ($M_w/M_n$) |
|---|---|---|
| I-2a | 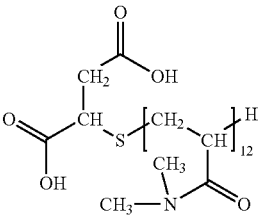 | 1300 (2.48) |
| I-3a | 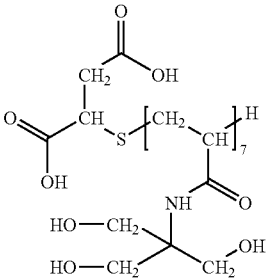 | 1400 (Not known) |
| I-3b | 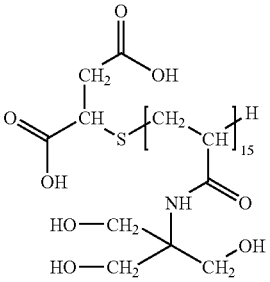 | 2778 (Not known) |
| I-4a | 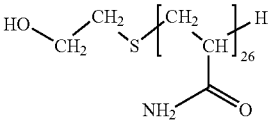 | 1950 (1.84) |
| I-5a | 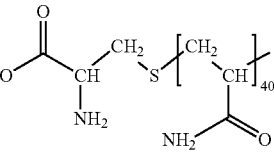 | 2990 (2.05) |
| I-6a | 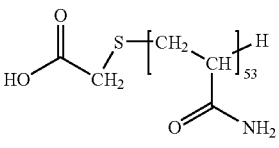 | 3820 (4.53) |
| I-7a | 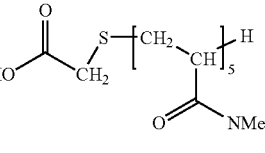 | 579 (2.09) |
| I-8a | 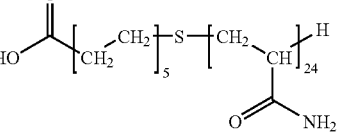 | 1920 (1.97) |

In general, the solid particulates relating to this invention range in particle size from 1 nm to 100 micrometer, preferably from 5 nm to 10 micrometer, more preferably from 10 nm to 3 micrometer and most preferably from 50 nm to 1 micrometer.

The composition comprises positively charged or chargeable solid particulates and an aqueous dispersing medium together with one or more dispersants of the invention and optionally a water-soluble binder and/or a pH modifier. As used herein the term 'dispersion' is generally used to refer more specifically to the solid particulates, aqueous dispersing medium and dispersant, whereas the term 'composition' is generally used to refer to the dispersion together with any added components which may be required, for example, for rendering the dispersion suitable for practical use. According to the invention, the composition is prepared using a mechanical mixing device such as, for example, a stirrer, homogeniser, milling device or high-pressure disperser.

If a water-soluble binder (or binders) is present it may be any binder known to the skilled person to be suitable for the purpose. Thus it may be a polymer, for example, starch and its modified products, polyvinyl alcohol and its modified products (e.g. acetyl acetylated polyvinyl alcohol), a polyvinyl acetate, hydroxycellulose, hydroxymethyl cellulose, carboxymethyl cellulose, polyvinyl pyrrolidone, polyvinylacetal including its derivatives and protein-derived polymers, such as gelatin and its derivatives. Particularly preferred are polyvinyl alcohols having a degree of hydrolysis of 86-89%, such as Gohsenol™ GH-17, Gohsenol™ GH-20 and Gohsenol™ GH-23, obtainable from Nippon Gohsei, Japan. It may also be a latex polymer such as, for example, a styrene acrylic latex or styrene butadiene latex. The amount of binder will vary from application to application, but it is generally present in an amount of from 0 to 40% w/w with respect to the solid particles, more preferably from 0 to 20% w/w, most preferably from 0 to 10% w/w.

A pH modifier could be any suitable organic or inorganic acid (mono or polyacid), but preferably a strong acid such as hydrochloric acid or nitric acid, which may also enhance the efficacy of the reduction in viscosity following high shear stress conditions.

Optionally, the composition may include other additives such as, for example, fillers or plasticisers, colorants (pigments or dyes), frost inhibitors, hardeners, accelerators, antioxidants, bactericides, antistatic agents, UV absorbers, UV light stabilizers and materials that limit the adverse effects of atmospheric gases or contaminants. These may be introduced into the composition to produce a more complex composition, for example, by solubilising or dispersing the additives into an aqueous solution or dispersion and mixing the resulting solution or dispersion of additives with the initial aqueous dispersion of solid particulate.

The solid particulate content in the dispersions of the invention normally ranges from a volume fraction of solids of about 0.02 to about 0.8, preferably about 0.1 to about 0.6, more preferably about 0.2 to about 0.5. The wt % content will vary with density of the dispersed solids, but in general the level is chosen such that the dispersion can be dispersed well with the dispersants of the invention and that the final dispersion is processable and manageable due to its improved dispersability and flowability.

The dispersant content in the dispersion is typically used in the range 1:1000 to 60:1000 w/w particulate solid, preferably 2:1000 to 50:1000 w/w particulate solid, more preferably 3:1000 to 45:1000 w/w particulate solid and most preferably 7:1000 to 16:1000 w/w particulate solid. However, given it is well known to those skilled in the art that the dispersants act at the particle surface, it is also well accepted by those practitioners that higher concentrations of dispersant will be required as particle sizes are reduced further and further due to the resulting increase in surface area.

A particular advantage of the dispersions of the invention is their use as components of coating materials in view of their improved dispersability and flowability after subjection to high shear.

Coating compositions using dispersants of the invention may be applied to one or both of a substrate surface through pre-metered or post-metered coating methods. These methods may include dip-coating, wound-wire rod coating, grooved rod coating, smooth rod coating, air knife coating, bent or bevelled blade coating, gravure coating, forward roll coating, reverse roll coating, multiple roll coating, slide coating, bead coating, extrusion coating and curtain coating. Known coating and drying methods are described in further detail in Research Disclosure No. 308119, published December 1989, pages 1007 to 1008. The coating composition can be coated either from water, water-based mixtures or organic solvents but water is preferred.

The choice of coating process would be determined from the economics of the operation and, in turn, would determine the formulation specifications such as coating solids, coating viscosity and coating speed. After application to the substrate, the coating fluids are generally dried by simple evaporation, which may be accelerated by known techniques such as convection heating. Further treatment, such as calendaring, may be used to apply a surface texture.

The substrate may be, for example, textiles, wood, metal or plastic, depending upon the proposed application. In a preferred embodiment, the substrate or support for use in the invention is paper, resin-coated paper or a transparent support. It may have a thickness of from about 10 to about 500 µm, preferably from about 50 to about 300 µm. Antioxidants, antistatic agents, plasticizers and other known additives may be incorporated into the support, if desired.

If the composition is to be used in an inkjet recording element, the support may be any of those usually used for inkjet receivers, such as resin-coated paper, paper, polyesters, or microporous materials such as polyethylene polymer-containing material sold by PPG Industries, Inc., Pittsburgh, Pa. under the trade name of TESLIN™, TYVEK™ synthetic paper (DuPont Corp.), and OPPalyte™ films (Mobil Chemical Co.) and other composite films listed in U.S. Pat. No. 5,244,861. Opaque supports include plain paper, coated paper, synthetic paper, photographic paper support, melt-extrusion-coated paper and laminated paper, such as biaxially oriented support laminates. Biaxially oriented support laminates are described in U.S. Pat. Nos. 5,853,965; 5,866,282; 5,874,205; 5,888,643; 5,888,681; 5,888,683 and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers from high end papers, such as photographic paper, to low end papers, such as newsprint.

The patents and publications referred to herein are incorporated by reference in their entirety.

The invention will now be described with reference to the following examples, which are not however to be construed as limiting the scope thereof.

EXAMPLES

Synthesis of Dispersants

The dispersants may be prepared by methods analogously to the examples herein and in accordance with Makromolekulare Chemie, (1992), 193(9), pages 2505-2517.

Example A

Synthesis of Compound (I-1a)

Mercaptosuccinic acid (15.0 g, 0.100 mol), acrylamide (50.00 g, 0.700 mol) and 2,2'-azobis(2-methylpropionitrile) (1.1 g) were suspended in methanol (1000 ml) in a 3N flask equipped with a reflux condenser. The mixture was degassed for 20 min. by bubbling through argon and then brought to reflux under argon atmosphere. Reflux was continued for a total of 72 h to ensure complete consumption of the monomer. The solid white mass that formed on cooling was washed with methanol, re-dissolved in water and freeze-dried to give a white solid (34.3 g, 52%). Analysis was consistent with the desired structure.

Example B

Synthesis of Compound (I-2a)

Mercaptosuccinic acid (1.51 g, 0.010 mol), N,N-dimethylacrylamide (6.94 g, 0.070 mol) and 2,2'-azobis(2-methylpropionitrile) (0.10 g) were suspended in methanol (150 ml) in a 3N flask equipped with a reflux condenser. The mixture was degassed for 20 min. by bubbling through argon and then brought to reflux under argon atmosphere. Reflux was continued for 24 h. The resulting solution was evaporated under reduced pressure to give a pale yellow gum (8.49 g, 100%). Analysis was consistent with the desired structure.

Comparative Examples

The efficacy of the dispersants of the invention was tested further by comparing their performance against a control with no dispersant and with a range of representative materials from the prior art. The compounds used in the above comparisons, are listed below:

| Dispersant | Structure | $M_n/\text{g}\cdot\text{mol}^{-1}$ | Name |
| --- | --- | --- | --- |
| C1 | *—[CH$_2$—CH(COOH)]$_n$—* | 2000 | Polyacrylic acid (Aldrich) |
| C2 | HOOC-CH$_2$-C(OH)(COOH)-CH$_2$-COOH | 192.1 | Citric acid |
| C3 | HOOC-CH$_2$-CH(SH)-COOH | 150.2 | Mercapto-succinic Acid (Aldrich) |
| C4 | —[CH$_2$—CH(CONH$_2$)]$_n$— | 1500 | Polyacrylamide (N10) |

Example 1

Control 1: Zinc Oxide Dispersion in Water with no Dispersant 5.49 g of zinc oxide (Aldrich, Cat. No. 20, 553-2, powder, <1 micrometer, 99.9% ZnO) were weighed out into a glass vial, 12.85 g millipore-purified water added, the vial sealed and the resulting dispersion stirred at room temperature in its sealed container. The final composition on a w/w basis was: 30% ZnO, 70% water. The sample was then left standing for over 1 h and then stirred again in readiness for rheological measurements.

All rheological measurements were made at 20 C using a Bohlin™ CS50 rheometer with a C2.3/26 small-sample cell. A 3 ml sample of the mixed dispersion was pipetted into the small-sample cell and then the shear stress in the cell was increased steadily in an incremental manner from a low shear stress of 0.04 Pa to a high shear stress in the region of 20-300 Pa over a period of 20-30 min. to ensure thorough mixing and a stable reading. (The value of high shear stress achieved in the Control 1 dispersion system depends on the viscosity of the system and, in the absence of dispersant, shear stresses as high as 300 Pa may be achieved).

Once a high shear stress point had been reached, the shear stress was decreased incrementally in a steady controlled manner and rheological data were collected using a delay time that is inversely proportional to the applied stress, set to 60 s at 0.04 Pa stress. The viscosity of the Control 1 dispersion system was recorded as a function of the decreasing shear stress: the results are illustrated in FIG. 1.

As illustrated in FIG. 1, the Control 1 dispersion gave the characteristics of a fluid at high shear stress, but behaved as a yield stress material when the shear stress was reduced below the yield stress, in that it became a gel. The yield stress behaviour is associated with the sudden, almost vertical, steep climb in viscosity that occurred with decreasing shear stress, which is directly due to the formation of a gel. The "yield stress value", as hereinbefore defined, of the Control 1 system was found to be approx. 45 Pa, which is a relatively high value, indicating a strong tendency to gel.

In Examples 2-5 the final composition on a w/w basis was 30% ZnO and 70% of a dilute aqueous solution of the dispersant concerned.

Example 2

Control 1: Zinc Oxide+Comparison Dispersant C1

An aqueous dispersion of ZnO was made up as in Example 1 with the exception that an aqueous solution of comparison dispersant C1 was used in place of the water. The dispersant was tested over the following final concentration range (w/w): 0.10%, 0.30%, 0.51% and 1.0%, representing a concentration range of dispersant to ZnO from 3:1000 to 33:1000. The rheology of each of these systems was measured as described in Example 1 and the results are shown in FIG. 2, where the curves A, B, C, D and E represent the results for 0%, 0.10%, 0.30%, 0.51% and 1.0% dispersant concentration respectively.

Figure 2:
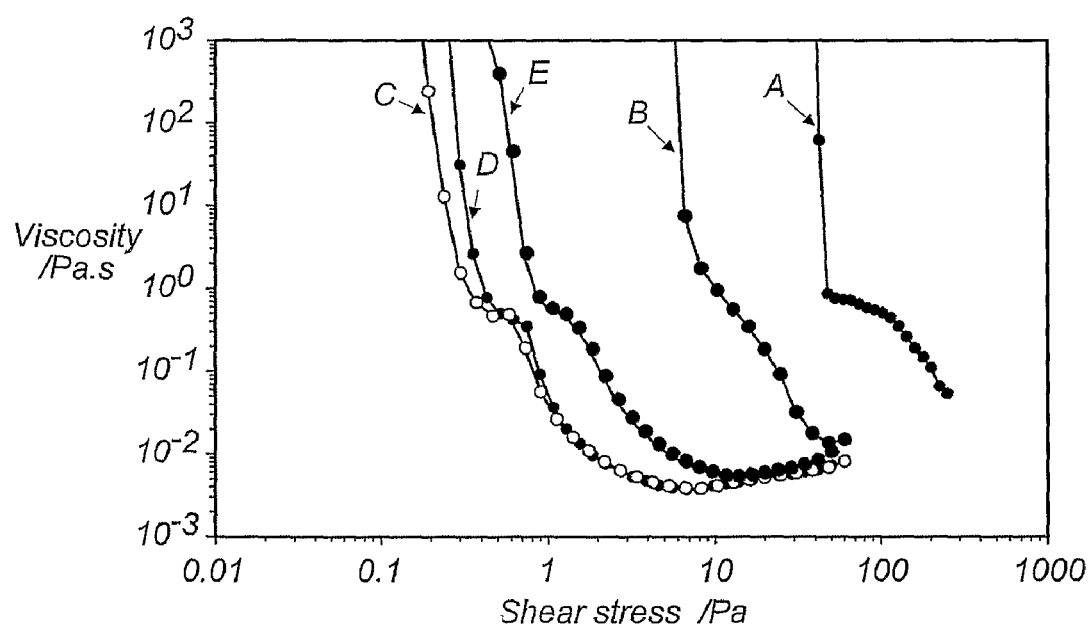
FIG. 2 shows the viscosity of zinc oxide with no dispersant (Curve A) and the comparison dispersant C1 at various concentrations (Curves B to E), with reducing shear stress.

FIG. 2 shows that C1 reduced the yield stress value at all concentrations tested relative to the Control 1 system (curve A). However, every system irrespective of dispersant concentration still resulted in a yield stress material with steeply climbing curves of viscosity v. shear stress. Hence each system gelled with reducing shear stress. There was also clearly an optimum concentration of dispersant for maximum effect, which in the above case was 0.3% dispersant, i.e. curve C. The optimum "yield stress value" (for 1000 Pa·s viscosity) is given in Table 1, where it will be seen that C1 reduced the yield stress value of the system by over 2 orders of magnitude relative to the Control 1 system, but even at its optimum concentration C1 was unable to prevent the basic Control 1 system from gelling, as shown in FIG. 2.

Example 3

Control 1: Zinc Oxide+Comparison Dispersant C2

Figure 3:
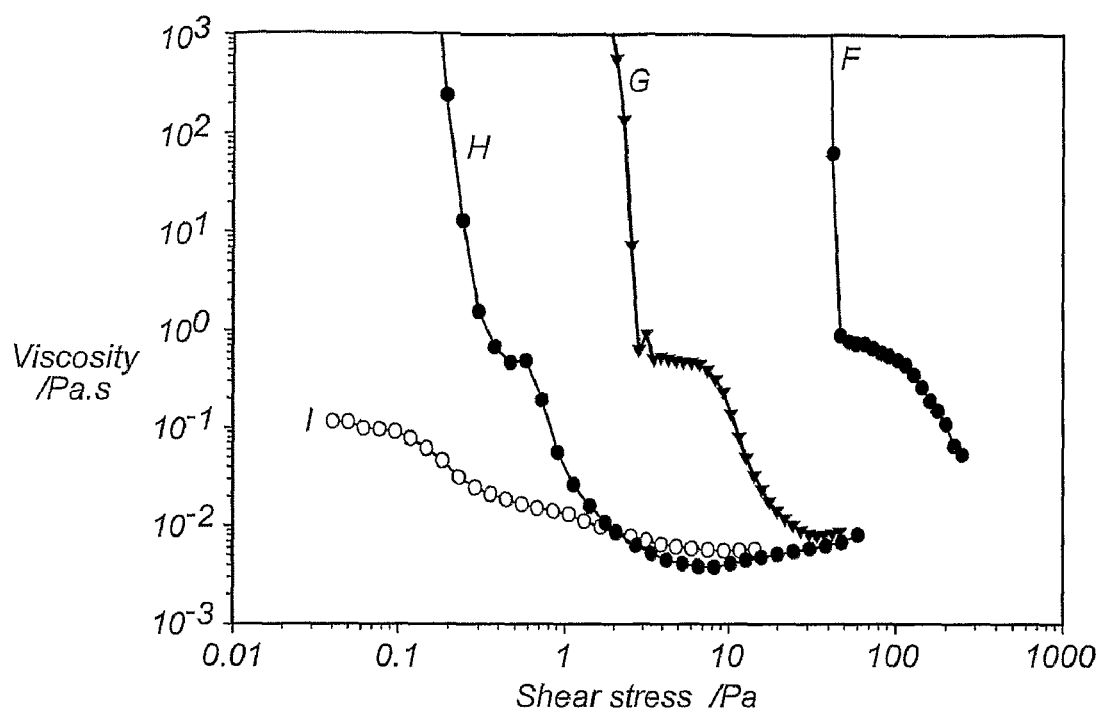
FIG. 3 shows the viscosity of dispersant I-1a of the invention (Curve I), comparison dispersants C1 and C2 (Curves H and G respectively) and the control with no dispersant (Curve F), with reducing shear stress.

An aqueous dispersion of ZnO was made up as in Example 1 with the exception that an aqueous solution of comparative dispersant C2 (citric acid —Fisher Scientific analytical reagent grade, Code: C/6200/53, 99.96%) was used in place of the water. The dispersant was tested over the final concentration range (w/w) 0.30% and 1.0%, representing a concentration range of dispersant to ZnO from 10:1000 to 33:1000 and the rheology of the systems was measured. The most effective result for reducing the "yield stress value" of the Control 1 was obtained with 0.3% concentration (Table 1), but C2 was unable to prevent the basic Control 1 system from gelling, as shown in FIG. 3.

Example 4

Control 1: Zinc Oxide+Comparison Dispersant C3

The objective of this example was to determine the impact that the chemical structure of a preferred anchor moiety of the invention had on the system when used in isolation chemically (from its polymer moiety).

An aqueous dispersion of ZnO was made up as in Example 1 with the exception that an aqueous solution of comparison dispersant C3 (mercapto-succinic acid, 97%) was used in place of the water. Here C3 represents a preferred anchor moiety of a dispersant of the invention.

Figure 4:
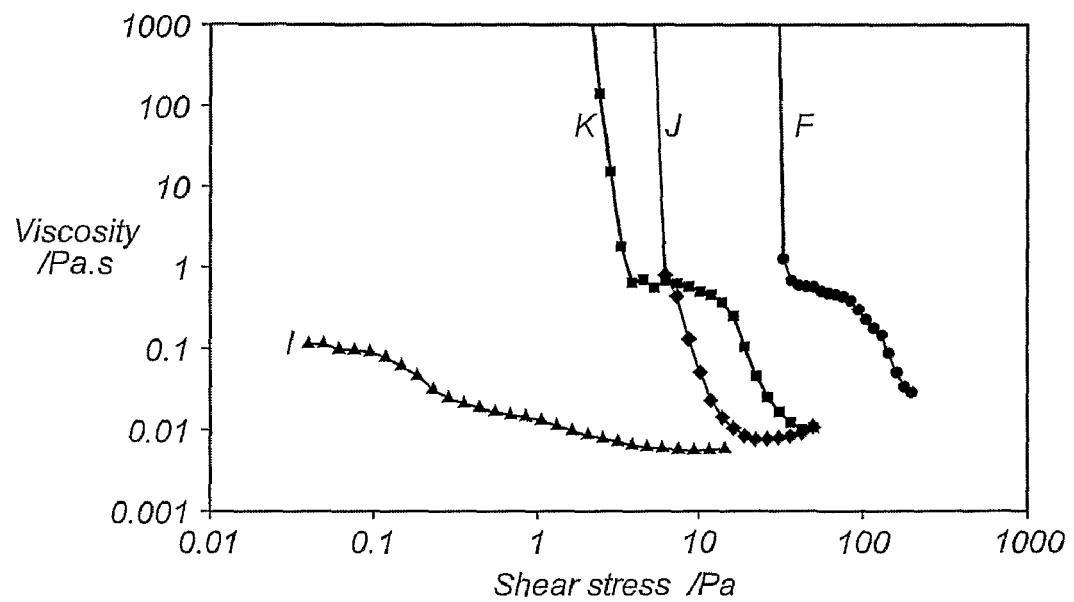
FIG. 4 shows the viscosity of dispersant I-1a of the invention (Curve I), comparison dispersants C3 and C4 (Curves J and K respectively) and the control with no dispersant (Curve F), with reducing shear stress.

C3 was tested over the following final concentration range (w/w): 0.10%, 0.29% and 0.5%, representing a concentration range of dispersant to ZnO from 3:1000 to 17:1000. All three concentrations reduced the "yield stress value" of the Control 1 system by 0.7 to 0.9 of an order of magnitude, with the optimum concentration being 0.5% (Table 1). Thus C3, which represents a preferred anchor moiety of a dispersant of the invention, possessed a limited capability for reducing the "yield stress value" of the Control 1 system, but was unable to prevent the Control 1 composition from gelling, as shown in FIG. 4. Hence a preferred anchor moiety of the invention is not particularly effective as a dispersant, when used in chemical isolation, i.e. not bonded chemically to a suitable polymer moiety as defined for a dispersant of the invention.

Example 5

Control 1: Zinc Oxide+Comparison Dispersant C4

The objective of this example was to determine what impact the chemistry of a preferred polymer moiety of the invention had on the system when used in isolation (from its anchor moiety) from a chemical perspective.

An aqueous dispersion of ZnO was made up as in Example 1 with the exception that an aqueous solution of comparative dispersant C4 (poly-acrylamide-Cyanomer N-10 supplied by American Cyanamid, MW=1.5 kg·mol$^{-1}$, 30% solids) was used in place of the water. Here C4 represents a preferred polymer moiety of a dispersant of the invention.

C4 was tested over the following final concentration range (w/w): 0.10%, 0.31%, 0.50% and 1.0%, representing a concentration range of dispersant to ZnO from 3:1000 to 33:1000. The "yield stress values" reduced with increasing concentration of C4 but, even at its most effective concentration C4 of 1.0%, it only lowered the yield stress of the Control 1 composition by just over an order of magnitude and hence was not as effective or efficient as C1 in this respect. Thus, C4, which represents a preferred polymer moiety of a dispersant of the invention, possesses a limited capability for reducing the "yield stress value" of the Control 1 system but is unable to prevent the Control 1 composition from gelling, as shown in FIG. 4. Hence a preferred polymer moiety of the invention is not particularly effective as a dispersant, when used in chemical isolation, i.e. not bonded chemically to a suitable anchor moiety as defined for a dispersant of the invention.

Example 6

Control 2: α-Aluminium Oxide Dispersion in Water with no Dispersant

The Control 2 system is defined as an aqueous dispersion of oxide, α-$Al_2O_3$ (Alpha Aesar, Stock No. 042573, 99.95% min., 0.35-0.49 micrometer APS powder) comprising 50 wt % α-$Al_2O_3$ and 50% millipore-purified water (w/w). The viscosity of the Control 2 dispersion system was recorded as a function of the decreasing shear stress from a high shear stress condition (approx. 200 Pa). Although fluid at 200 Pa, the viscosity started rising immediately with reducing shear. Before the shear stress had been decreased a full order of magnitude in value, the system showed the characteristic steep vertical rise in viscosity associated with a yield stress material. The "yield stress value" was measured to be approximately 39 Pa, similar to the Control 1 system based on 30% zinc oxide in water. Hence the Control 2 system shows a strong tendency to gel.

Example 7

Control 2: α-Aluminium Oxide+Comparison Dispersant C2

An aqueous dispersion of α-$Al_2O_3$ was made up as in Example 6 with the exception that an aqueous solution of comparison dispersant C2 was used in place of the water. Therefore the final composition on a w/w basis was 50% α-$Al_2O_3$ and 50% C2. The dispersant was tested over the following final concentration range (w/w): 0.30% and 1.0%, representing a concentration range of dispersant to α-$Al_2O_3$ from 10:1000 to 33:1000. In each case the viscosity of the dispersion systems was recorded as a function of decreasing shear stress from a high shear stress (approx. 200 Pa). Both systems were fluid at 200 Pa but on reducing the shear stress, the viscosity started rising immediately with reducing shear for both concentrations. Before the shear stress had been reduced by a full order of magnitude, both systems showed the characteristic steep vertical rise in viscosity associated with a yield stress material. The "yield stress values" were almost identical: the optimum being 32 Pa for the 1.0% dispersant concentration. This value is similar to those obtained with the Control 2 system in the absence of dispersant and hence C2 has little impact on the rheology of the Control 2 system and the system still shows a strong tendency to gel.

Example 8

Control 3: Chromium (III) Oxide Dispersion in Water with no Dispersant

The Control 3 system is defined as an aqueous dispersion of $Cr_2O_3$ (Aldrich, Cat. No. 20, 216-9, 98+%, 1 micrometer powder), comprising 35 wt % $Cr_2O_3$ and 65% millipore-purified water (w/w). The viscosity of the Control 3 dispersion system was recorded as a function of the decreasing shear stress from a high shear stress (approx. 70 Pa.) Although fluid at 70 Pa, the viscosity started rising immediately with reducing shear. However, in just over an order of magnitude reduction in shear stress from high shear (shear stress ~6 Pa), the system showed the characteristic steep vertical rise in viscosity associated with a yield stress material. The "yield stress value" was found to be approx. 4.5 Pa, which is an order of magnitude lower than the Control 1 system (30% zinc oxide in water alone). Although this value is lower than that of Controls 1 and 2, the presence of the yield stress condition still indicates a definite tendency to gel.

Example 9

Control 3: Chromium (III) Oxide+Comparison Dispersant C2

An aqueous dispersion of $Cr_2O_3$ was made up as in Example 8 with the exception that an aqueous solution of comparison dispersant C2 was used in place of water. Therefore the final composition on a w/w basis was 35% $Cr_2O_3$ and 65% aqueous C2. The dispersant was tested over the following final concentration range (w/w): 0.1%, 0.2%, 0.30%, 0.5% and 1.0%, representing a concentration range of dispersant to $Cr_2O_3$ from 3:1000 to 29:1000. The viscosity of each of the dispersion systems was recorded as a function of the decreasing shear stress from a high shear stress of approx. 70 Pa. All the systems were fluid at high shear and in all cases their viscosities started rising immediately with reducing shear. At the point where the shear stress had been reduced by a factor of approximately 3, all systems showed the characteristic steep vertical rise in viscosity associated with a yield stress material. The optimum concentration of 0.2% C2 showed a "yield stress value" of 1.2 Pa which, whilst significantly less than that of the Control 3 system, shows that C2 does not prevent the system from gelling.

TABLE 1

Rheological Properties of Comparison Systems

| Ex No. | Test System + Comparison Dispersant | Yield Stress Value/ Pa (% optimum concentration w/w dispersant) |
|---|---|---|
| 1 | Control 1 (30% ZnO + No dispersant) | 45 |
| 2 | Control 1 + C1 | 0.2 (0.3%) |
| 3 | Control 1 + C2 | 1.9 (0.3%) |
| 4 | Control 1 + C3 | 5.4 (0.5%) |
| 5 | Control 1 + C4 | 2.9 (1.0%) |
| 6 | Control 2 (50% α-$Al_2O_3$ no dispersant) | 39 |
| 7 | Control 2 + C2 | 32 (1.0%) |
| 8 | Control 3 (35% $Cr_2O_3$ no dispersant) | 4.5 |
| 9 | Control 3 + C2 | 1.2 (0.2%) |

Examples 1, 6 and 8, demonstrate that aqueous dispersions of fine, particulate, metal oxides (ZnO, α-$Al_2O_3$, and $Cr_2O_3$) can result in yield stress systems (i.e. they can, for example, form gels) when the solids content of their dispersions are high, in these particular cases, 30-50% by weight. One outcome of this characteristic is that the rheology of such an aqueous particulate dispersion limits the maximum concentration of solids that is manageable in the resulting composition.

The results also illustrate that simple and polymeric acid-based materials disclosed in the prior art for reducing the viscosity of aqueous dispersions of particulate inorganic oxides, such as ZnO, α-$Al_2O_3$ and $Cr_2O_3$, are ineffective in preventing the dispersion systems from gelling when the solids content of the dispersions are high.

In addition, Table 1 contains two Examples relating to the individual anchor and polymer moieties of one of the preferred dispersants of the invention. In this context, the anchor and polymer moieties were tested in isolation from a chemical perspective: the anchor moiety being represented by C3 (mercaptosuccinic acid) and the polymer moiety being represented by C4 (a polyacrylamide comprising an average of ~20 monomer units). When used individually as dispersants in the Control 1 system, C3 and C4 were generally not as effective as the prior art dispersants C1 and C2, i.e. the two major component parts of a structure of one of the preferred dispersants of the invention are not effective as dispersants when used in isolation from one another, from a chemical viewpoint.

Examples of the Invention

Example 10

Control 1: Zinc Oxide+Dispersant of the Invention I-1a

An aqueous dispersion of ZnO was made up as in Example 1, with the exception that an aqueous solution of I-1a was used in place of the water. The final composition on a w/w basis was 30% ZnO and 70% aqueous dispersant. The dispersant was tested over the following final concentration range (w/w): 0.10%, 0.30% and 0.50%, representing a concentration range of dispersant to ZnO from 3:1000 to 17:1000. In each case the viscosity of the dispersion systems was recorded as a function of decreasing shear stress from a high shear stress of 20-300 Pa. (When the viscosity is very low, as is often the case in the presence of an optimum amount of a dispersant of the invention, the high shear stress achieved may be as low as 20 Pa., whereas in the absence of a dispersant shear stresses as high as 300 Pa may be achieved).

At 0.5% concentration I-1a, the system did not gel with decreasing stress and the system remained fluid until the lowest shear stress of 0.04 Pa was reached. Hence a "yield stress value" could not be defined in this case. Another parameter was needed to define systems that form a fluid medium. The low shear viscosity at 0.04 Pa shear stress (the lowest shear stress measured) was adopted as the characteristic parameter for the fluid systems. In this particular case the low shear viscosity value was measured to be 0.12 Pa·s. The "yield stress values", where applicable, and "low shear viscosity values" are recorded in Table 2.

Thus relative to Table 1, an extra column is included in Table 2 for recording the "low shear viscosity values" of systems that are fluid. Effectively a sample tends to possess, either a "yield stress value" or a "low shear viscosity value": no examples were found that possessed both, so these data entries appear to be mutually exclusive. A yield stress system is defined by a steeply rising viscosity that climbs well above a viscosity of 1000 Pa·s, whereas a fluid system exhibits a viscosity 0.04 Pa (stress) that is typically well below 1000 Pa·s and is usually showing signs of leveling-off with reducing shear stress.

In summary, I-1a is capable of preventing the ZnO dispersion system (Control 1) from gelling, providing it is used within its optimum range of concentration. In this case the optimum range of concentration is in the region of 0.5%, i.e. around 17:1000 dispersant to ZnO. In this respect, I-1a showed a distinct advantage over comparison dispersants C1 and C2, which were unable to fluidize the Control 1 system at their optimum level and resulted in yield stress systems (i.e. gelling systems).

FIG. 3 illustrates the scale of the difference in rheological performance between (I-1a) and C1 and C2 in the Control 1 system.

The curves in FIG. 3 are represented as follows:
Curve F represents the basic Control 1 system, 30% ZnO+ 70% water with no dispersant.
Curve G represents the system, Control 1+C2 (citric acid), with C2 at the most effective concentration found of 0.3% w/w.

Curve H represents the system, Control 1+C1 (polyacrylic acid), with C1 at the most effective concentration found of 0.3% w/w. Curve I represents the system, Control 1+I-1a, with I-1a at the most effective concentration found of 0.5% w/w.

FIG. 3 illustrates:—

1. The escalating viscosity at 45 Pa shear stress, demonstrating the high yield stress character of the basic ZnO dispersion, Control 1 (Curve F).
2. The escalating viscosities of Control 1 systems in the presence of optimum amounts of C1 (Curve H) and C2 (Curve G), which show that they are yield stress (gelling) systems, despite their development at lower shear stresses than Control 1.
3. The elimination of the yield stress problem in the Control 1 system in the presence of an optimum amount of I-1a (0.5% w/w), by the development of fluid-like behaviour with a levelling-off value of low shear viscosity (Curve 1).

Hence FIG. 3 demonstrates how a dispersant of the invention can reduce the viscosity of dispersion systems and prevent them from gelling, relative to prior art dispersants.

The combination of anchor moiety and polymer moiety chemistries defined in Formula (I) is essential for the materials of the invention to function as highly effective dispersants. To demonstrate this point, the rheological data from this Example—based on I-1a—was compared with that of C3 and C4, which represent chemistry of the anchor and polymer moieties of I-1a very closely. The results are shown in FIG. 4.

The curves in FIG. 4 are represented as follows:

Curve F represents the basic Control 1 system, 30% ZnO+ 70% water with no dispersant.

Curve J represents the system, Control 1+C3 (mercaptosuccinic acid), with C3 at the most effective concentration found of 0.5% w/w.

Curve K represents the system, Control 1+C4 (Cyanomer N10—poly-acrylamide), with C4 at the most effective concentration found of 1.0% w/w.

Curve I represents the system, Control 1+I-1a, with I-1a at the most effective concentration found of 0.5% w/w.

FIG. 4 demonstrates the efficacy of the combination of chemistries used in the dispersants of the invention compared to that of its two representative individual moieties. The representative individual moieties, represented by curves J and K, have some impact in reducing the "yield stress value" of the Control 1 dispersion system, but nowhere near as great as the impact of dispersant I-1a (curve I), which in principle is the two moieties linked chemically together. This combination of chemistries in the dispersant of the invention reduces the low shear viscosity of the Control 1 dispersion system by several orders of magnitude, turning the formulation into a non-gelling fluid system. This produces the advantage of making the formulation more manageable and/or permitting further loading of solids into the system.

Example 11

Control 2: α-Aluminium Oxide+Dispersant of the Invention I-1a

An aqueous dispersion of $\alpha$-$Al_2O_3$ was made up as in Example 6 with the exception that an aqueous solution of I-1a was used in place of the water. The final composition on a w/w basis was 50% $\alpha$-$Al_2O_3$ and 50% aqueous dispersant (I-1a). The dispersant was tested over the following final concentration range (w/w): 0.10%, 0.30%, 0.49 and 0.98%, representing a concentration range of dispersant to $\alpha$-$Al_2O_3$ from 2:1000 to 20:1000. In each case the viscosity of the dispersion systems was recorded as a function of decreasing shear stress from a high shear stress of 20-300 Pa.

At 0.49% and 0.98% concentrations of I-1a, the systems did not gel with decreasing stress and the systems remained fluid until the lowest shear stress of 0.04 Pa was reached and so a "yield stress value" could not be defined in these cases. These systems are thus described by their low shear viscosity value at 0.04 Pa shear stress. The most effective result was obtained at 0.49% concentration of the dispersant, where the low shear viscosity at 0.04 Pa shear stress was 0.003 Pa·s. Hence there is a region of optimum concentration of the dispersant for fluidizing the dispersion containing 50% w/w $\alpha$-$Al_2O_3$, which occurs in the locality of 0.5% w/w. In this region, the dispersant of the invention reduces the low shear viscosity of the Control 2 dispersion system by several orders of magnitude, turning the formulation into a non-gelling fluid system.

Example 12

Control 3: Chromium (III) Oxide+Dispersant of the Invention I-1b

An aqueous dispersion of $Cr_2O_3$ was made up using the same method and materials as those utilized in preparing the Control 3 in Example 8, with the exception that an aqueous solution of I-1b, was used in place of the water. The final composition on a w/w basis was 35% $Cr_2O_3$ and 65% dilute aqueous dispersant. The dispersant was tested over the following final concentration range (w/w): 0.11%, 0.30% and 0.49%, representing a concentration range of dispersant to $Cr_2O_3$ from 3: to 14:1000. In each case the viscosity of the dispersion systems was recorded as a function of decreasing shear stress from a high shear stress (20-80 Pa). Effective results were obtained at 0.3% and 0.49% concentration of the dispersant, the optimum being at 0.49% when the low shear viscosity at 0.04 Pa shear stress was 115 Pa·s. Hence it appears there is a region of optimum concentration of the dispersant for fluidizing the 35% $Cr_2O_3$ dispersion, which occurs in the locality of 0.3-0.5% w/w. In this region, the dispersant of the invention reduces the low shear viscosity of the Control 3 dispersion system below 1000 Pa·s and hence is characterized as a fluid system with a low shear viscosity at 0.04 Pa shear stress and not as a yield stress system. Hence I-1b is much more effective than C2 in the Control 3 system, which at its optimum concentration of 0.2% resulted in a yield stress system with "yield stress value" of 1.2 Pa (Example 9).

Example 13

Control 1: Zinc Oxide+Dispersant of the Invention I-2a

An aqueous dispersion of ZnO was made up as in Example 1 with the exception that an aqueous solution of I-2a, was used in place of the water. The final composition on a w/w basis was 30% ZnO and 70% aqueous dispersant. The dispersant was tested over the following final concentration range (w/w): 0.09%, 0.30% and 0.49%, representing a concentration range of dispersant to ZnO from 3:1000 to 16:1000. In each case the viscosity of the dispersion systems was recorded as a function of decreasing shear stress from a high shear stress (30-300 Pa).

At 0.3% and 0.49% concentrations of I-2a, the systems did not gel with decreasing shear stress and the systems remained fluid until the lowest shear stress of 0.04 Pa was reached. Hence a "yield stress value" could not be defined in these cases and these systems are described by their low shear viscosity value at 0.04 Pa shear stress. The region of optimum concentration of the invention dispersant for fluidizing the 30% ZnO dispersion appears to be in the vicinity of 0.3% concentration. At this concentration, the dispersant reduced the low shear viscosity to the extremely low value of 0.003 Pa·s, which is several orders of magnitude below that of the Control 1 system alone. In the Control 1 system, I-2a was more effective at reducing viscosity than I-1a (see Example 10) showing that poly-N,N-dimethylacrylamide was here more effective than polyacrylamide.

Example 14

Control 1: Additional Zinc Oxide+Dispersant of the Invention I-2a

The aim of this example was to take one of the dispersion samples from Example 13 that possessed more than the optimum level of I-2a and then attempt to increase the amount of ZnO solid in the system until its rheology was similar to that of the original Control 1 dispersion. The objective here was to demonstrate that systems containing a near optimum amount of a dispersant of the invention could be loaded with more dispersion than the original control system that contained no dispersant, without any penalty.

A system that was technically overdosed with dispersant was used to allow for the dilution effect on the dispersant/solid ratio on adding extra solids. Hence a sample that contained 1.0% I-2a was selected for the experiment, 0.3% concentration representing the original optimum level of dispersant (see Example 13).

ZnO was added in stages until the rheology closely resembled that of the Control 1 Example. The solids content of the ZnO dispersion was raised from 30% to 66.6%, i.e. more than double the original loading. This gave a yield stress system with a "yield stress value" of 17 Pa, which was still a little less than that of the Control 1 system (45 Pa), but nevertheless of the same order of magnitude. This demonstrates how the loading of a dispersion system can be improved by using a dispersant of the invention. Thus if a dispersion can be handled or managed at the original concentration of 30% solids, then a dispersion containing 66% solids could be managed in the presence of a dispersant of the invention.

Example 15

Control 3: Chromium (III) Oxide+Dispersant of the Invention I-2a

An aqueous dispersion of $Cr_2O_3$ was made up using the same method and materials as those utilised in preparing the Control 3 in Example 8, with the exception that an aqueous solution of I-2a was used in place of the water. The final composition on a w/w basis was 35% $Cr_2O_3$ and 65% aqueous dispersant. The dispersant was tested over the following final concentration range (w/w): 0.09%, 0.30% and 0.50%, representing a concentration range of dispersant to $Cr_2O_3$ from 3:1000 to 14:1000. In each case the viscosity of the dispersion systems was recorded as a function of decreasing shear stress from a high shear stress (20-300 Pa). The most effective result was obtained at 0.30% concentration of the dispersant, where the low shear viscosity at 0.04 Pa shear stress was 110 Pa·s. Hence there is a region of optimum concentration of the dispersant for fluidizing the $Cr_2O_3$ dispersion, which occurs in the locality of 0.3% w/w. In this region, the invention dispersant reduced the low shear viscosity of the Control 3 dispersion system below 1000 Pa·s and hence is characterized as a fluid system, with a low shear viscosity at 0.04 Pa shear stress, and not as a yield stress system. I-2a shows a similar effectiveness to I-1b in the Control 3 system and hence is also much more effective than C2 in the Control 3 system, which at its optimum concentration of 0.2% resulted in a yield stress system with "yield stress value" of 1.2 Pa (see Example 9—Table 1).

TABLE 2

Rheological properties of dispersants of the invention

| Ex No. | Test System + Comparison Dispersant | Yield stress value/ Pa (Conc. w/w dispersant) | Low Shear Viscosity/Pa · s at 0.04 Pa shear stress if no yield stress value (Conc. w/w dispersant) |
|---|---|---|---|
| 10 | Control 1 + (I-1a) | | 0.12 (0.50%) |
| 11 | Control 2 + (I-1a) | | 0.003 (0.49%) |
| 12 | Control 3 + (I-1b) | | 115 (0.49%) |
| 13 | Control 1 + (I-2a) | | 0.003 (0.30%) |
| 14 | 66.6% ZnO + 0.5% I-2a + 32.9% water | 17 (0.48%) | |
| 15 | Control 3 + (I-2a) | | 110 (0.30%) |

In summary, the results in Table 2 demonstrate that the dispersants of the invention were able to reduce or eliminate yield stress and reduce the viscosity of aqueous dispersions of positively charged solid particulates, herein inorganic oxides, especially with a high solids content, provided a suitable concentration/level of dispersant were found. As with most dispersants, those of the invention possessed an optimum concentration for maximum performance, which was dependent on the solid particulate system, its concentration, its particle size, pH and other addenda.

The dispersants of the invention work with solid particulates and in particular inorganic oxides that are below their isoelectric point, i.e. where they are cationically charged, which in practical terms for aqueous systems in the absence of acid, means solid particulates with an isoelectric point above pH 5.8, i.e. the pH of water saturated with carbon dioxide. ZnO, $\alpha$-$Al_2O_3$ and $Cr_2O_3$ are three such examples that can be used with advantage.

In most cases, the dispersants of the invention reduced the dispersion to a fluid system with a definable low shear viscosity, whereas the control dispersion, or the control dispersion with a comparison dispersant (see Table 1), tended to result in a yield stress system (gelling system). Example 14 demonstrates that a dispersant of the invention lowers the viscosity of a dispersion system so effectively that more solids can be added to the system, without making the viscosity or yield stress any higher than the original dispersion system in the absence of dispersant. It is thus established that dispersants of the invention permit increased loading of solids in such dispersions.

Example 10 in Table 2, shows that when anchor and polymer moieties of a structure of one of the preferred dispersants of the invention, namely mercaptosuccinic acid and polyacrylamide were chemically linked together in an anchor-polymer conformation as defined in the invention, in this case as I-1a, the resulting compound reduced the viscosity of the dispersion by a totally unexpected magnitude. This is graphically depicted in FIG. 4. These data show the importance in the invention of the combination of anchor and stabilizing polymer moieties.

Example 16

Coatings: Alumina/PVA Dispersion in Water with and without Dispersant of the Invention I-3b
Composition with No Dispersant 5.92 g of alumina were weighed out into a glass vial. Thereafter the following components were added: 2.024 g of an aqueous PVA (binder) solution containing 12.43% w/w Gohsenol™ GH23 (active wt. GH23=0.252 g); 0.063 g of an aqueous solution containing 40 wt % glyoxal (hardener) and 7.99 g of water. The resulting dispersion was stirred by hand with a spatula. The final composition on a w/w basis was: 37.0% alumina, 1.6% Gohsenol™ GH-23, 0.16% glyoxal and 61.3% water.
Composition with Dispersant of the Invention I-3b:

5.92 g of alumina were weighed out into a glass vial. Thereafter the following components were added: 2.025 g of an aqueous PVA (binder) solution containing 12.43% w/w Gohsenol GH23 (active wt. GH23=0.252 g); 5.12 g of an aqueous solution containing 5.0 wt % of the dispersant of the invention I-3b (active wt. I-3b=0.2560 g); 0.074 g of an aqueous solution containing 40 wt % glyoxal (hardener) and 2.873 g of water. The resulting dispersion was stirred by hand with a spatula. The final composition on a w/w basis was: 37.0% alumina, 1.6% Gohsenol GH-23, 1.6% I-3b, 0.18% glyoxal and 59.6% water.

Each of the above compositions was coated several times, each in the following manner. Each formulation was coated onto 7 mil gelatin-subbed Estar™ (~100 μm thick) using an R K Print Motorised K Control Blade Coater (manufactured by R K Print Coat Instruments Ltd). Coatings were made using a coating speed of 1.6 cm·s$^{-1}$ (speed setting 3) and a blade height of 150 μm (set with a feeler gauge before each coating). The temperature of the coating block was controlled by recirculating water maintained at 40°±0.1 C, giving a block surface temperature of 39.0°±0.5 C. The coating quality was improved by fan-assisted drying using a standard, static, desktop fan set 50 cm away from the coating block at the same height as the block.

The dry coatings were then examined visually using reflected light. It was observed that all the control coatings, with no dispersant, contained multiple coating lines, which were presumed to be due to "clunkers" i.e. larger particles of poorly dispersed alumina. In strong contrast, all formulations made using the dispersant of the invention I-3b gave very uniform coatings without lines.

Figure 5A:
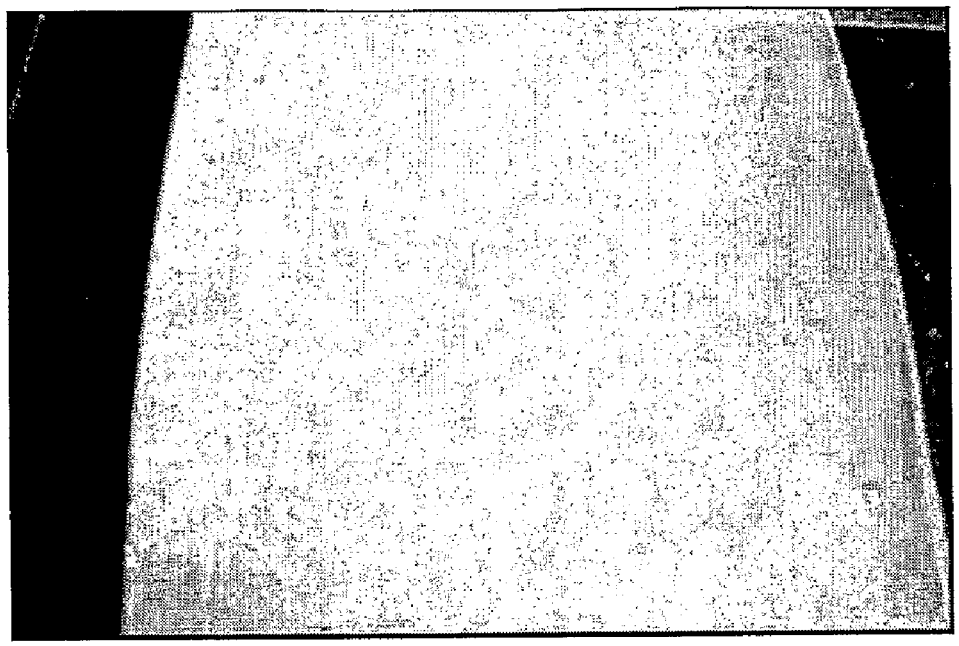
FIGS. 5a and 5b show the relative uniformity of two coating compositions based on alumina and a commercial polyvinylalcohol binder, respectively without and with a dispersant of the invention I-3b.
Figure 5B:

This difference is illustrated photographically in FIGS. 5a and 5b using two representative coatings from the above study, one without a dispersant and the other with dispersant of the invention I-3b. These photographs were obtained by illuminating the coatings from the side in a darkroom using a horizontally mounted Beck microscope lamp positioned about 1 metre away. The coatings were tipped about 12° from the horizontal towards the lamp to help the illumination of surface imperfections.

Thus the coating quality can be improved when a dispersant of the invention is used to disperse the alumina media, as in FIG. 5b, compared to the case when no dispersant is present, as in FIG. 5a. Thus, in addition to the rheological benefits, the dispersing capability of a dispersant of the invention is demonstrated, indicating that a dispersant of the invention produces a much finer dispersion of alumina than water alone.

The invention claimed is:

1. A coating composition containing positively charged or chargeable solid particulates, the composition comprising one or more dispersants in association with an aqueous dispersing medium, wherein said dispersant comprises a compound having an anchoring moiety linked to a polymeric hydrophilic moiety, said anchoring moiety containing at least one acid and/or hydroxy group and having an overall acidity or neutrality and said polymeric moiety having a lower affinity for surfaces of the solid particulates than said anchoring moiety and wherein said solid particulates are selected from the group consisting of metal oxides, metal hydroxides, metal carbonates, nitrides, ceramics, metals and latexes, all at a pH below their isoelectric point; further wherein said compound has the formula (I):

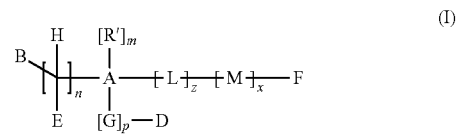

wherein
A is carbon or nitrogen,
R' is hydrogen or an alkyl, aryl or heterocyclic group and m is 1 when A is carbon and m is 0 when A is nitrogen;
B is an acid group or an ester or amide thereof, or a hydroxy group;
each E is independently hydrogen, an amino group or an acid group or an ester or amide of an acid group, and n is 0 or an integer from 1 to 10;
D is a hydrogen atom, an amino group, an acid group or an ester or amide of an acid group, an alkyl group, or an alkyl group substituted with one or more acid groups or an ester or amide of an acid group;
G is a carbonyl group or an alkylene, aminoalkylene or oxyalkylene group and p is 0 or 1;
L is a linking group selected from the group consisting of sulfur and alkylene, ester, thioester, amide, thioamide, ketone, thioketone, ether, thioether and polyalkylenethio groups, and z is 1;
D and L or D, G and L may combine with A to form a 5-, 6- or 7-membered ring which may include one or more further heteroatoms selected from the group consisting of nitrogen, oxygen and sulfur;
each M is a monomer unit, which may be the same or different, comprising an acrylamide or methacrylamide, and x is 5-200; and
F is hydrogen or a halogen atom, an alkyl group, a thiol, a neutral thioether, an ether, an ester, or an alkyl- or arylsulfonate group;
with the proviso that (a) the number of acid groups is equal to or greater than the number of amino groups therein and (b) there is at least one hydroxy or acid group.

2. A composition as claimed in claim 1 wherein said solid particulates have an isoelectric point above pH 5.8.

3. A composition as claimed in claim 1 wherein said solid particulates are metal oxides selected from the group consisting of $Al_2O_3$, $CeO_2$, $Co_3O_4$, $Cr_2O_3$, $CuO$, $Eu_2O_3$, $Fe_2O_3$, $HgO$, $MgO$, $NiO$, $PuO_2$, $TiO_2$, $UO_2$, $ZnO$ and $ZrO_2$.

4. A composition as claimed in claim 1 wherein said positively charged or chargeable solid particulates have a particle size from 50 nm to 1 micrometer.

5. A composition as claimed in claim 1 wherein said positively charged or chargeable solid particulate content in said composition is a volume fraction of solids of about 0.2 to about 0.5.

6. A composition as claimed in claim 1 wherein the weight ratio of said dispersant to the positively charged or chargeable solid particulates is 7:1000 to 16:1000.

7. A method of coating a substrate comprising the steps of
   (a) providing a coating composition of claim 1;
   (b) applying said coating composition to said substrate to form a coating thereon; and
   (c) drying the resultant coating.

8. A coating composition as claimed in claim 1 wherein each acid group of the anchoring moiety of the compound is independently selected from the group consisting of a carboxylic acid, sulfonic acid or phosphoric acid.

9. A coating composition as claimed in claim 1 wherein said polymeric hydrophilic moiety of the compound is selected from the group consisting of polyacrylamide, poly-N,N-di-methylacrylamide, poly-2-acryl-amido-2-hydroxymethyl-1,3-propandiol, poly-methacrylamide, poly-N-methyl-acrylamide and poly-N-methyl-methacrylamide and mixtures thereof.

10. A coating composition as claimed in claim 1 wherein A is carbon and R' is hydrogen or a methyl group.

11. A coating composition as claimed in claim 1 wherein any acid group as or forming part of B, E, D or G is independently selected from the group consisting of a carboxylic acid, sulfonic acid and phosphoric acid.

12. A coating composition as claimed in claim 1 wherein z is 1 and L is sulfur.

13. A coating composition as claimed in claim 1 wherein x is 10-50.

14. A coating composition as claimed in claim 1 wherein said monomer unit M is acrylamide or N,N-dimethyl-acrylamide or a mixture thereof.

15. A coating composition as claimed in claim 1, wherein the dispersant has the structure

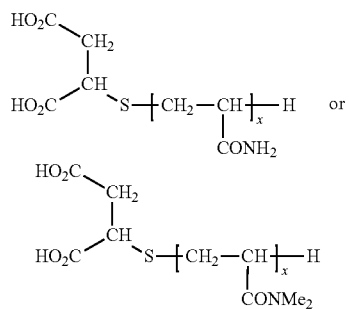

wherein x is from 10-50.

16. A coating composition as claimed in claim 1 wherein said solid particulates are inorganic solid particulates having an isoelectric point above pH 5.8.

* * * * *